(12) United States Patent
Baldwin et al.

(10) Patent No.: US 8,589,807 B2
(45) Date of Patent: Nov. 19, 2013

(54) PRESENTING QUESTION AND ANSWER DATA IN A SOCIAL NETWORKING SYSTEM

(75) Inventors: Robert Michael Baldwin, San Francisco, CA (US); Adrian A. Graham, San Francisco, CA (US); Drew W. Hamlin, San Francisco, CA (US); Benjamin E. Hiller, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 199 days.

(21) Appl. No.: 13/070,475

(22) Filed: Mar. 24, 2011

(65) Prior Publication Data

US 2012/0246575 A1   Sep. 27, 2012

(51) Int. Cl.
*G06F 3/048* (2013.01)
*G06F 15/16* (2006.01)

(52) U.S. Cl.
USPC ........... 715/753; 715/733; 715/781; 715/810; 715/835; 715/838; 705/319

(58) Field of Classification Search
USPC ......... 715/733, 751, 753, 764, 765, 835, 781, 715/810, 838; 705/319
See application file for complete search history.

(56) References Cited

U.S. PATENT DOCUMENTS

| | | | |
|---|---|---|---|
| 8,103,947 B2 * | 1/2012 | Lunt et al. | 715/200 |
| 8,275,736 B2 | 9/2012 | Guo et al. | |
| 8,380,716 B2 | 2/2013 | Mirus | |
| 8,380,743 B2 | 2/2013 | Convertino et al. | |
| 2003/0227479 A1 * | 12/2003 | Mizrahi et al. | 345/753 |
| 2007/0074250 A1 | 3/2007 | Furukawa | |
| 2008/0294637 A1 | 11/2008 | Liu | |
| 2008/0307320 A1 * | 12/2008 | Payne et al. | 715/751 |
| 2010/0217645 A1 | 8/2010 | Jin et al. | |
| 2011/0055309 A1 | 3/2011 | Gibor et al. | |
| 2011/0093404 A1 * | 4/2011 | Lawless et al. | 705/319 |
| 2011/0106662 A1 | 5/2011 | Stinchcomb | |
| 2011/0131106 A1 | 6/2011 | Eberstadt et al. | |
| 2011/0161419 A1 | 6/2011 | Chunilal | |
| 2012/0040325 A1 | 2/2012 | Gange | |
| 2012/0135389 A1 | 5/2012 | Desruisseaux | |
| 2012/0173992 A1 * | 7/2012 | D'Angelo et al. | 715/751 |
| 2012/0226688 A1 | 9/2012 | Reid et al. | |
| 2012/0233020 A1 | 9/2012 | Eberstadt et al. | |
| 2012/0233253 A1 | 9/2012 | Ricci | |

OTHER PUBLICATIONS

Patent Cooperation Treaty, International Search Report and Written Opinion, International Patent Application No. PCT/US2012/028144, Jun. 7, 2012, 11 pages.

* cited by examiner

*Primary Examiner* — Xiomar L Bautista
(74) *Attorney, Agent, or Firm* — Fenwick & West LLP

(57) ABSTRACT

A social networking system includes a question and answer system that displays to a viewing user questions and answers provides by other users of the social networking system. The question and answer system may display answers to a particular question in a way that visually indicates both the global answer set and a subset of the global answer set, such as the viewing user's friends. The social networking system may also display to a viewing user news stories about another user asking or answering a question, where the format of the displayed new stories is based on an affinity that the viewing user has for the user who provided the question or answer mentioned in the news story. The displayed questions and/or answers may be associated with an object in the social networking system, where the user interface provides additional information about those objects.

20 Claims, 9 Drawing Sheets

What are your favorite restaurants in San Francisco? ← 600

Foreign Cinema
Rosamunde Sausage Grill
Beretta Pizzeria & Bar
Boogaloos
Range

+ Add an answer ...
21 more ▸

Asked By
John Smith ← 605
17 hours ago

Followers (4) ← 610

Friend's Questions        See All

Which shoe store has the best selection of ...
Asked by Sid

What are the credits?
Asked by Vishu

What's the good restaurant walking distance ...
Asked by Sonya

49 Votes - Share - Report

Follow ← 635        Ask Friends ← 630

Posts
Write something...

Friends - Others (1) ← 670

PRESENTING QUESTION AND ANSWER DATA IN A SOCIAL NETWORKING SYSTEM

BACKGROUND

This invention relates generally to social networking and, in particular, to a user interface for displaying questions asked and answered by users of a social networking.

Traditional question and answer software systems use a search interface that links into a set of documents that discuss various topics for answering users' questions. For example, a question entered by a user is searched using natural language processing systems to retrieve documents that answer the question. Often, the documents that are presented to the user do not specifically answer the question entered, and instead they simply offer an encyclopedic explanation of the general topic of the question.

User-generated content question and answer systems have emerged in recent years to address this problem. In these systems, a user posts a question to a forum, and one or more other users answer the question. Answers to the question are displayed under the question, often in sequential format. Other systems allow users to post polls which allow other users to select a pre-designated answer. Yet other systems allow users to vote on answers to post questions. In these systems, however, the display of answer data to posted questions is inflexible and lacks social context.

SUMMARY

Embodiments of the invention provide a question and answer system within a social networking environment. A user interface for the question and answer system enables users of the social networking system to view questions and answers provides by other users of the social networking system in a manner that facilitates social interactions among the users without burdening the users with irrelevant information.

In one embodiment, the question and answer system displays answers to a particular question in a way that visually indicates both the global answer set and a subset of the global answer set. The subset of answer data may comprise answer data associated with the social networking system users who are connected to the viewing user. In this way, a user who is viewing the answers for a particular question may simultaneously view all answers to a question along with the answers provided by a user's friends. In one example, the answers contain a shaded bar or other visual indication of their global frequency, but they are sorted by the frequency of the answer among the viewing user's friends. The answers may also be displayed next to images or links to the viewing user's friends. Each user who views the answers to a question may thus see a different display of the answers, and the display is personalized based on the viewing user's social network.

In another embodiment, a social networking system may display to a viewing user a number of news stories associated with the interactions between users connected to the viewing user. The news stories may include questions posed by other users as well as answered provided by other users of the social networking system. The format of the displayed new stories may vary based on the type of interaction (e.g., question or answer) and based on the affinity that the viewing user has for the user who provided the question or answer mentioned in the news story. For example, if a close friend of the viewing user answers a question, the news story may mention that the friend answered the question and also include an interface that allows the viewing user to answer that question from within the news story. But if a more distant friend answers a question, the news story may merely mention this fact without providing an interface for answering the question. In this way, the news stories use the viewing user's affinity for a user who answered a question to determine how likely the viewing user will want to answer the same question, thus avoiding cluttering the viewing user's newsfeed with irrelevant content.

In another embodiment, the question and answer system allows users to pose a question or answer a question by linking a portion of the question or answer to an object in the social networking system or otherwise providing structured data. Then, in the display of the question and its answers, the user interface provides additional information about the objects. For example, a question that asks people to state their favorite restaurant may be answered by users who tag the answers with pages or other objects associated with each restaurant in the answers. The user interface may display the answers along with additional information about the tagged objects, such as maps to each restaurant and a listing of other friends who have checked-in to that location. In this way, the user interface provides personalized social context about the question and its answers to each viewing user.

BRIEF DESCRIPTION OF THE DRAWINGS

FIG. 6 is an example screenshot illustrating the display of a question and answer data, in accordance with an embodiment of the invention.

FIG. 8 is an example screenshot illustrating the display of object information in a question and answer interface, in accordance with an embodiment of the invention.

Figure 1:
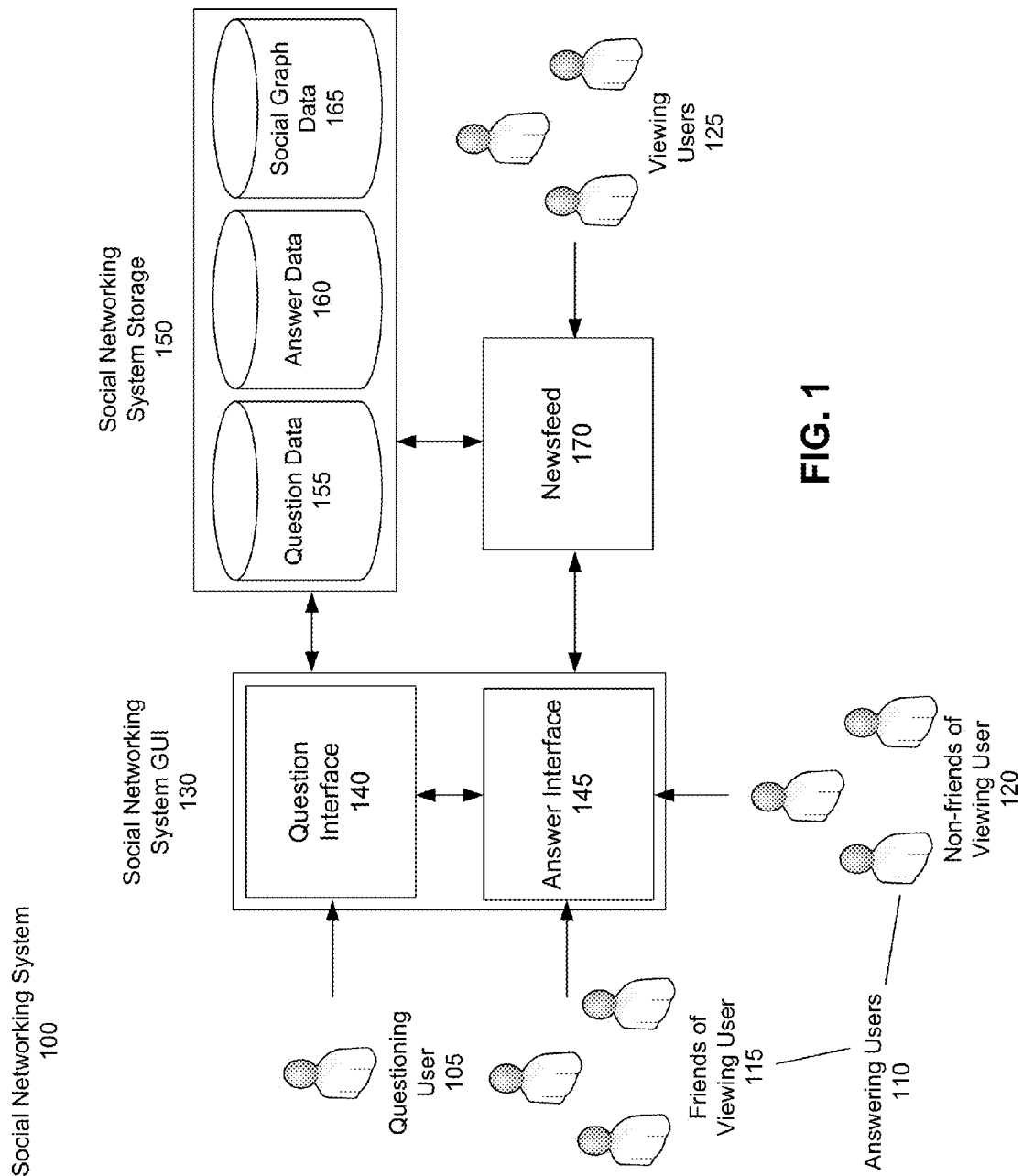
FIG. 1 is a high-level block diagram illustrating the creation and display of questions and answer data in a social networking system, in accordance with an embodiment of the invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A social networking system offers its users the ability to communicate and interact with other users of the social networking system. Users join the social networking system and add connections to a number of other users to whom they desire to be connected. Connected users are said to be "friends" in the context of the social networking system. Social networking systems comprise a series of interconnected pages, which may be displayed in a web browser or native application on a client device. Users of a social networking system can provide information describing themselves which is stored and displayed in pages called user profiles. For example, a user can provide age, gender, geographical location, education history, employment history and similar information describing the user. The information provided by users may be used by the social networking system to direct information to the user. For example, the social networking system may recommend social groups, events, and potential friends to a user.

Social networking system information that is tracked and maintained by a social networking system may be stored as a social graph, which includes a plurality of nodes that are interconnected by a plurality of edges (representing interactions, connections, communications or other measures of relatedness between nodes). A social graph node may represent a social networking system object that can act on and/or be acted upon by another node. An edge between nodes in a social graph represents any kind of connection or interaction between the two nodes, which may result from an action that was performed by one of the nodes on the other node. For example, two friends or otherwise connected users in a social networking system may be represented by nodes in the social graph, which may be connected by an edge representing the friendship within the social networking system. Likewise, a user may use a device with location-detection functionality (such as a mobile phone with GPS functionality) to "check in" to a real-world location (such as a dance club); the user and the dance club may each be represented by nodes in the social graph which may be connected by an edge representing the user's presence at the dance club in the real world.

A social networking system object may be a social networking system user, non-person entity, content item, group, social networking system page, location, application, concept or user interest item, such as a movie, a band, or a book. Content items may be anything that a social networking system user or other object may create, upload, edit or interact with, such as messages, queued messages (e.g., email), text and SMS (short message service) messages, comment messages, messages sent using any other suitable messaging technique, an HTTP link, HTML files, images, videos, audio clips, documents, document edits, calendar entries or events, and other computer-related files. Social graph data, such as object data, user data and interaction data, is stored in social graph data storage module 165. In one embodiment, question data storage module 155, answer data storage module 160, and social graph data storage module 165 comprise the same storage module.

A question and answer service on a social networking system can use the tools and features of the social networking system to improve the performance and utility of the question and answer service. For example, a question and answer service may use a social networking system's social graph when displaying answer data to a viewing user. Subsets of answer data may be displayed to a viewing user simultaneously based on the nodes connected to the viewing user's node in the social graph. For instance, a viewing user may be able to view all answer data from all social networking system users and the subset of answer data from friends in a single interface. In this way, social networking system users receive a more personalized and useful experience from a question and answer service on a social networking system.

FIG. 1 is a high-level block diagram illustrating the creation and display of question and answer data in a social networking system, in accordance with an embodiment of the invention. The social networking system 100 comprises a social networking system graphical user interface (GUI) 130 for displaying a question and answer service. The social networking system GUI 130 may be used for all social networking system pages, or may be customized for a question and answer service. The social networking system GUI 130 comprises a question interface 140 and an answer interface 145. Question interface 140 and answer interface 145 may comprise the same interface, though for clarity, the functionalities of each are discussed separately below.

Questions and answers may be represented by nodes in the social graph, and may be connected to each other, to questioning user 105, to answering users 110, to viewing users 125, and to any other social networking system node. Questions, objects connected to questions in the social graph, and interactions represented by edges connecting questions in the social graph are referred to as "question data." Answers, objects connected to answers in the social graph, and interactions represented by edges connecting answers in the social graph are referred to as "answer data." Question data may be stored in question data storage module 155, and answer data may be stored in answer data storage module 160. FIGS. 6-9 are example screenshots illustrating the display of questions and answer data, in accordance with an embodiment of the invention, and will be discussed below in greater detail.

Question Interface Functionality

A questioning user 105 uses question interface 140 in ask a question to users of social networking system 100. The question interface 140 may be graphically rendered on the social networking system 100 in various locations to encourage users to use the question and answer service. In one embodiment, for example the embodiment of FIG. 6, question interface 140 comprises a dedicated social networking system page. Alternatively, question interface 140 may appear in a portion of another social networking system page, such as in a margin of a user profile. A user may add a tab or a button in a social networking system GUI 130 which may be clicked to display the question interface 140.

Question interface 140 may comprise a field in which questioning user 105 may type and submit a question. Various types of questions may be posed, viewed, and answered by users of the social networking system using the question interface 140. Polling questions may be asked by a questioning user 105 to see various percentages of responding users, such as the questions "Should Don't Ask and Don't Tell legislation be repealed?" and "Which is better, San Francisco or Los Angeles?" Questions may also include video, audio, and image files as the main content of the question. For example, a questioning user 105 may submit a question that includes an image of a bird and the text "What kind of bird is this?" Another example may include a questioning user 105 who wants feedback on a musical performance and uploads a video or audio file and asks the polling question, "Should I perform this song for my senior recital?" Questions may be asked which prompt users to answer more than once. For example, in the embodiment of FIG. 6, the question asked by questioning user John Smith 605 is "What are your favorite restaurants in San Francisco?" 600.

Question interface 140 may allow a questioning user 105 to submit one or more potential answers to a submitted question. For example, a question user 105 may ask "What is your favorite beach in Northern California?", and may include the potential answers "Stinson", "Manresa", and "Pacifica." Question interface 140 may allow questioning user 105 to allow other users to submit their own answers, may allow questioning user 105 to restrict answers to those submitted by questioning user 105, or may allow questioning user 105 to allow a mix of questioning user-submitted answers and user-submitted answers.

Question interface 140 may allow a questioning user 105 to select which social networking system users can view and/or answer questions. For example, questioning user 105 may select a subset of social networking system users who can view and answer a question, such as the friends of questioning user 105, members of a network or group, or any other subset of users selected by questioning user 105. In one embodiment, questions asked by questioning user 105 are visible to all users of the social networking system 100. In one embodiment, unless a questioning user 105 restricts who can view and answer a question, question interface 140 makes the question available to all users of the social networking system 100 by default.

Question interface 140 may include the functionality to enable a questioning user 105 to "tag" other users in a question. A questioning user 105 may tag a user in order to target the question to particular social networking system users. For example, a questioning user 105 may ask "What is the best restaurant in San Francisco?", and may tag friends that live in San Francisco or have a particular taste in restaurants. Tagging users in a question may result in the tagged users being notified of the question, and may result in the names of the tagged users being displayed in conjunction with the question. Tagging a user in a question may also result in the questioning user 105 being notified when the tagged user answers the question. Tagging users in a question may cause the users to "follow" a question, which is discussed in greater detail below. Tagging users in a question may cause a pop up window to display a list of the tagged users within question interface 140 when a viewing user 125 moves a user input (such as a computer mouse pointer or a finger on a touch-sensitive display) over the question or the names of the tagged users displayed below the question. Selecting a tagged user in the list of tagged users may cause the viewing user 125 to be directed to the profile page of the selected tagged user. The displayed list of tagged users may comprise pictures (such as profile pictures) of the tagged users next to the associated names of the tagged users.

Figure 7:
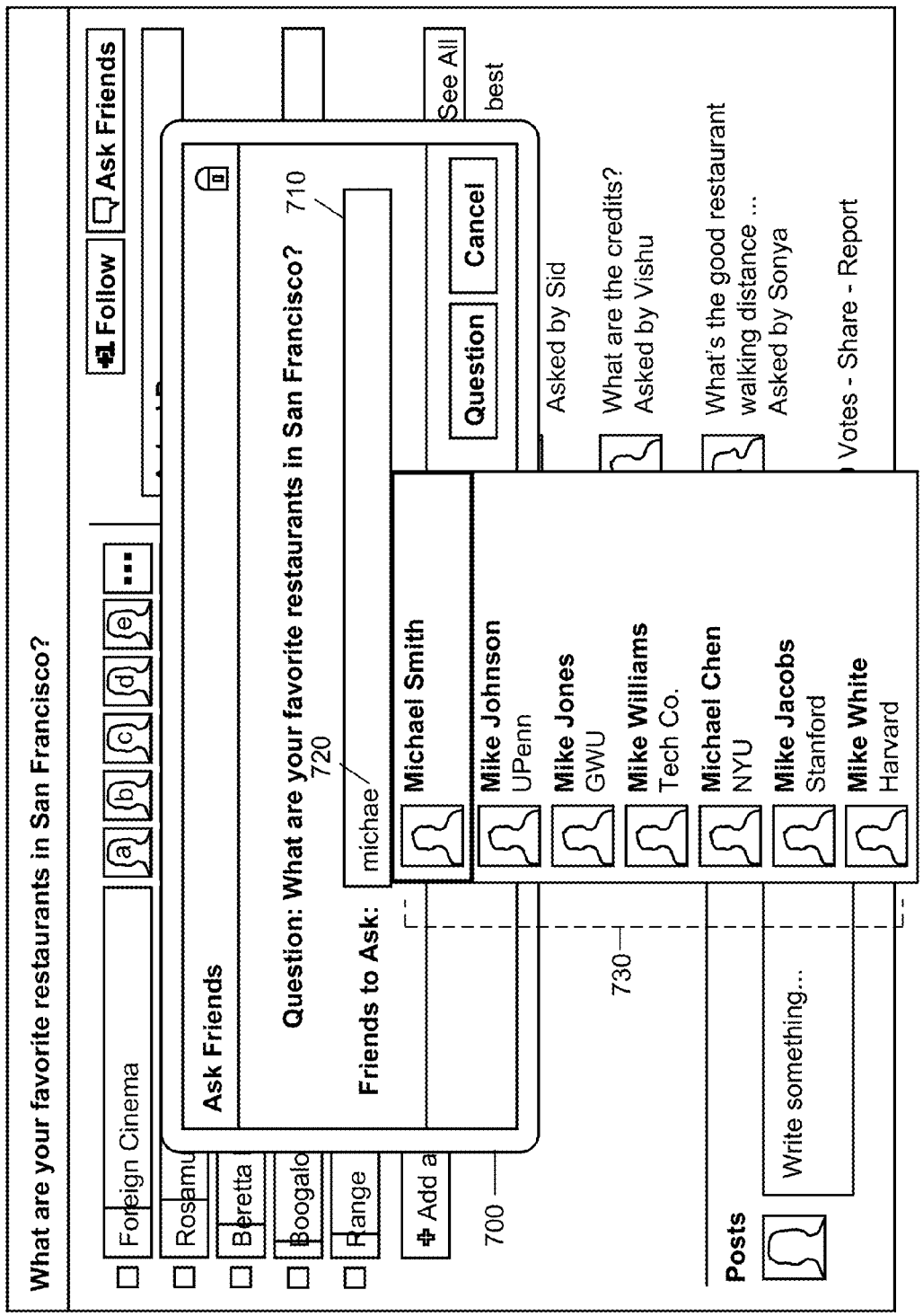
FIG. 7 is an example screenshot illustrating text prediction in a question and answer interface, in accordance with an embodiment of the invention.

Question interface 140 may allow users other than questioning user 105 to tag users in a question. For example, a viewing user 125 may not know the answer to a question, but may know a friend who has expertise in the field of the question; the viewing user 125 may tag the friend to notify the friend of the question and encourage the friend to answer the question. Tagged users may be notified of being tagged in a question by any suitable communication medium, such as email, wall posts, pop-up notifications, text messages and instant messages. Tagging a user in a question may cause the user's node and the question's node to be connected in the social graph. Question interface 140 may provide an interface for tagging users in a question. In the embodiment of FIG. 6, question interface 140 provides "ask friends" button 630. In the embodiment of FIG. 7, when button 630 is clicked, pop-up window 700 appears. Pop-up window 700 contains text field 710, which a user may use to type the name of another user. Alternatively, pop-up window 700 may contain a drop-down menu which allows a user to select particular social networking system users to tag. Question interface 140 may provide predictive text functionality for tagging users in a question. In the embodiment of FIG. 7, when the text "michae" 720 is typed, names of users 730 containing the text "michae" or close variants are displayed.

Question interface 140 may suggest users to tag in a question to questioning user 105. In one embodiment, question interface 140 suggests groups or networks of friends. Alternatively, question interface 140 may suggest users who are friends with questioning user 105, who are currently online or logged into the social networking system 100, who have answered questions posted by questioning user 105 or other users, or who have previously checked into locations associated with the question. In one embodiment, question interface 140 uses the social graph to determine users who are connected to the questioning user 105, or who are connected to objects associated with or tagged in a question (discussed below).

Question interface 140 may also include the functionality to enable a questioning user 105 to tag objects in the social networking system in a question. For example, questioning user 105 may ask "Has anyone ever been to AT&T Park?", and may tag a social networking system object representing AT&T Park, such as an AT&T Park location, or a San Francisco Giants fan page. In the embodiment of FIG. 6, questioning user John Smith 605 may tag the question term "San Francisco." The names of tagged objects in a question may be displayed below the question. Questioning user 105 may allow or disallow users other than questioning user 105 to tag objects in a question, and may allow questioning user 105 to remove objects tagged by other users in a question. Tagging an object in a question may cause the object's node and the question's node to be connected in the social graph. Tagged objects in a question may describe people, locations, things or concepts related to the question, and may allow the question to be indexed by tagged object. Question interface 140 may provide a text box with predictive text functionality that displays objects related to a user's typed text. Question interface 140 may also automatically tag objects in a question. In one embodiment, question interface 140 parses question text into keywords and tags social networking system objects related to the parsed keywords to the question. For example, for the question "What is the best sports bar in Atlanta?", question interface 140 may parse the keywords "sports bar" and "Atlanta", and tag the question to objects representing these keywords.

Tagging objects in a question may cause a pop up window to display a list of the tagged objects or information related to tagged objects when a viewing user 125 moves a user input over the question or the names of the tagged objects displayed below the question. Selecting an object in the list of tagged objects may cause the viewing user 125 to be directed to a social networking system page or external web page associated with the object. Information related to tagged objects may comprise information related to the object itself, information related to users who have interacted with the object, or information related to interactions between a user and the object. In one embodiment, information related to tagged objects comprises a map displaying the locating of the object to be displayed. In one embodiment, information related to with a business entity object comprises reviews of the business entity. Any information associated with a tagged object may be displayed when the tagged object is either selected from a list of tagged objects displayed in a pop-up window, or when a user input moves over the tagged question in question interface 140. Tagged objects may be determined by identifying all object nodes connected to the node representing the tagged question in the social graph.

Question interface 140 may also include the functionality to allow users to follow questions. In the embodiment of FIG. 6, question interface 140 may provide a "follow" button 635 that when clicked allows a viewing user 125 to follow question 600. Following a question may allow new question activity (such as new answers, new votes, new communications, etc.) to be automatically pushed to a following user's newsfeed on the social networking system 100. In one embodiment, only new question activity from friends is pushed to a following user's newsfeed. In one embodiment, any user may follow a question. Alternatively, following a question may be automatically limited to friends of questioning user 105, or questioning user 105 may select a subset of social networking system users who may follow a question. In one embodiment, answering users 110 automatically follow questions they answer. Question interface 140 may allow users to follow a question by providing a button or link that, when selected, allows the users to follow the question. Users following a question may be displayed in question interface 140. For example, in the embodiment of FIG. 6, pictures of users 610 (user b, user e, user f, and user n) are displayed for following the question 600. Additionally, question interface 140 may allow an entity or moderator of a social networking system group, fan page, or network to answer a question on behalf of the entity. For example, a question such as "When will the concert dates be announced for Journey?" can be followed by interested users and answered by the moderator of an official Journey fan page.

Question interface 140 may allow a questioning user 105 to set an expiration date for questions, after which question interface 140 may remove the question from social networking system 100, or may prevent the question from being voted on or viewed by users. In one embodiment, question interface 140 may automatically assign a question an expiration date. Alternatively, question interface 140 may allow questions to never expire.

Answer Interface Functionality

Answering users 110 of the social networking system 100 may use answer interface 145 to answer a question asked by a questioning user 105 of social networking system 100. Using the answer interface 145, answering users 110 may respond to the question using text, HTML, video, audio, and any other communication delivery mechanisms. Answering users 110 may comprise users that are friends of a viewing user 115 and users that are not friends of a viewing user 120. In addition, users may view the question and/or answers without answering the question. Although viewing users 125 are shown in FIG. 1 to be coupled to newsfeed module 170, viewing users 125 may view questions and/or answers through question interface 140, answer interface 145, or any other suitable social networking system interface. Further, the term "viewing users" as used herein describes users who request to view or are currently viewing a particular question, and who may or may not answer the particular question, or who may have already answered the question. Thus, answering users 110 and viewing users 125 are not mutually exclusive.

The answer interface 145 may be graphically rendered on the social networking system 100 in various locations. The answer interface 145 may be coupled to or displayed in conjunction with the question interface 140. For example, in the event of a dedicated social networking system question and answer service page, recently submitted questions may be displayed, each displayed question having the functionality to accept and display answers from social networking system users. Likewise, for a question that appears in a user's news feed, answer interface 145 may be displayed immediately below the question, or may not be displayed until a "display answers" button or link is selected.

Answer interface 145 may comprise a field which allows viewing users 125 to submit an answer to an associated question. For example, in the embodiment of FIG. 6, field 615 allows a viewing user 125 to type an answer to question 600. Submitted answers may be saved, displayed to and selected by future viewing users 125. Answer interface 145 may also comprise a series of potential answers submitted by questioning user 105 or other answering users 110 which a viewing user 125 can vote on using, for example, buttons associated with each answer. In the embodiment of FIG. 6, answers 620 are displayed, each containing a button which when selected allows a viewing user 125 to vote on one or more of answers 620. For example, if a viewing user 125 wanted to vote for the answer "Boogaloos", the viewing user 125 would select button 625.

Answer interface 145 may display the answers and votes of other answering users 110. Continuing the example above, answer interface 145 may display the question "What is your favorite beach in Northern California?", and may display the questioning user-submitted answers "Stinson", "Manresa", and "Pacifica", as well as the answering user-submitted answers "Moss Beach" and "Miramar." Answers may be displayed in text fields, graphical bubbles, text boxes, or any suitable format.

Similar to question interface 140, answer interface 145 may allow users to tag objects in answers. For example, questioning user 105, answering users 110 or viewing users 125 may tag a social networking system object associated with an answer to the answer. Tagging objects in an answer may cause a pop up window to display a list of objects tagged to the answer or information related to the tagged object when a viewing user 125 moves a user input over the answer. Information related to tagged objects may comprise information related to the object itself, information related to users who have interacted with the object, or information related to interactions between a user and the object. Continuing the above example, answer interface 145 may display a map to Stinson beach or a link to the Stinson beach website if viewing user 125 movies a user input over the answer "Stinson" and the map or link are tagged in the answer "Stinson."

Figure 8:
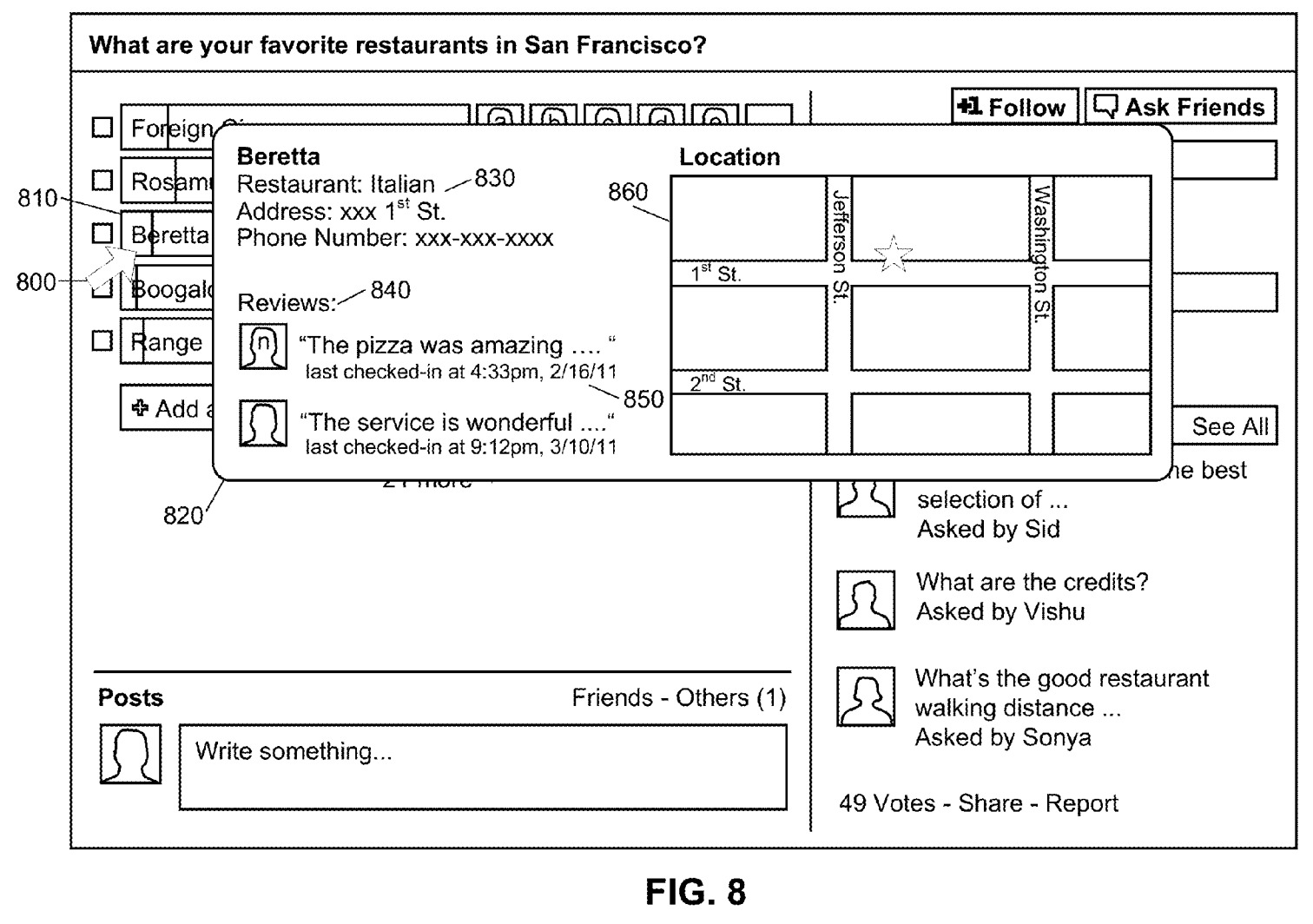

In the embodiment of FIG. 8, if the object "Beretta" is tagged to answer "Beretta" 810, moving mouse pointer 800 over the answer "Beretta" 810 may cause pop-up window 820 to be displayed. Contact and categorical information 830 about the object Beretta and a map 860 of the object Beretta's location are displayed. In addition, user-generated reviews 840 are displayed. In the embodiment of FIG. 8, a review from user n is displayed, and the last time 850 user n used a location-detection device to check-in to the object Beretta is displayed.

In addition, answer interface 145 may automatically tag objects in answers. For example, answer interface 145 may parse the text of the question and the text of one or more answers to determine an object related to an answer. In this example, the question "What is your favorite restaurant" and the answer "The Refuge" and may be parsed, and an object related to The Refuge Restaurant may be tagged to the answer. Continuing with this example, if an answering user 110 selects the answer "The Refuge" and has previously checked in to The Refuge Restaurant, the location The Refuge Restaurant may be tagged in the answer "The Refuge". Continuing further with this example, social graph edge data may also be displayed when a user input is moved over an answer.

Thus, moving a user input over the answer "The Refuge" may cause the name of the answering user 110 to be displayed in a pop-up window along with an indication that the answering user 110 checked in to The Refuge Restaurant and the date answering user 110 checked in to The Refuge Restaurant. Any information associated with a tagged object may be displayed when the tagged object is either selected from a list of tagged objects or when a user input moves over the tagged answer in question interface 140. Tagged objects may be determined by identifying all nodes connected to the node representing the tagged answer in the social graph. For example, if a user "likes" or otherwise endorses an answer, the user's node and the answer's node will be connected, and the user may be automatically tagged in the answer.

Answer interface 145 may display answer data, such as the number or percentage of votes each answer has received. In one embodiment, displaying answer data comprises textually displaying a number or percentage of votes in conjunction with, over or next to each displayed answer. In one embodiment, displaying answer data comprises graphically representing the number or percentage of votes. For example, answer text may be displayed in white boxes, and the boxes may be filled with blue shading according to the percentage of votes each answer receives. In this example, if an answer receives 20% of the total answer votes, the leftmost 20% of the box containing the answer will be shaded. This is illustrated in the embodiment of FIG. 6, where each answer in answers 620 is displayed in a text box 645, and the proportion of each text box 645 is shaded according to the proportion of votes each answer received. For example, the answer "Range" received 10% of the vote among all users who answered question 600, and the text box containing "Range" is 10% shaded 650. In one embodiment, instead of displaying all answer data, only a particular subset of answer data is displayed, such as the answer data from friends of a viewing user 115.

More than one subset of answer data may be displayed simultaneously. For example, the votes of friends of a viewing user 115 may be textually displayed next to each answer, while the total number of votes (votes of friends of viewing user 115 and non-friends of viewing user 120) are graphically displayed over each answer. Any subsets of answer data may be displayed simultaneously, and any method of displaying the subsets of answer data may be used. Social networking system 100, answer interface 145, questioning user 105 or viewing user 125 may determine which subsets of answer data to display simultaneously to viewing user 125, and how to display the one or more subsets of answer data.

Answer interface 145 may organize displayed answers in a variety of ways. Answers may be displayed in the order they are received, or in an order designated by questioning user 105. Answers may also be ordered based on the number of votes they receive. In one embodiment, answers are ordered based on the total number of votes they receive across all social networking system users. In an alternative embodiment, answers are ordered based on the number of votes from a subset of social networking system users. This subset may comprise friends of a viewing user 115, a pre-designated set of friends of a viewing user (such as members of a social networking system group or network), or a set of friends selected by a viewing for the purpose of filtering answers. Further, answer interface 145 may display only answers voted on or received from friends of viewing user 115. In addition, answers may be organized based on demographic information, such as age, gender, work place, location, hometown, school or any other demographic information of answering users 110. Even further, answers may be organized based on votes of answering users 110 located nearby viewing user 125, or based on answering users 110 who have previously checked-in to the location of viewing user 125. Answer interface 145 may also comprise functionality to toggle between various methods of organizing or displaying answers, such as a button which when selected switches between ordering answers based on total votes of answering users 110 and votes of friends of viewing user 115, or which switches between one demographic of answering users 110 (such as over 25 years of age) and another demographic of answering users 110 (such as under 25 years of age).

Answer interface 145 may limit the number of answers displayed to a viewing user 125. In one embodiment, answer interface 145 may limit the number of displayed answers to a predetermined number. Alternatively, answer interface 145 may limit the number of displayed answers based on other factors, such as the client device a viewing user 125 is using to view the answers or the social networking system context of the displayed answers. For example, if a viewing user 125 is using a large monitor, answer interface 145 may display as many answers as can be displayed within the social networking system GUI 130 displayed on the monitor. Alternatively, if a viewing user 125 is using a mobile phone to view answers, answer interface 145 may display very few answers to accommodate the smaller monitor size. Further, more answers may be displayed if answer interface 145 is displayed within a dedicated social networking system page than if answer interface 145 is displayed (for instance) within the margins of another social networking system page, within a pop-up window, within a news feed, or within any other social networking system context of limited space. In the embodiment of FIG. 6, five answers 625 to question 600 are displayed within a dedicated social networking system page.

In one embodiment, if answer interface 145 limits the number of answers displayed to a viewing user 125, answer interface 145 may display a button or link indicating that additional answers are not being displayed ("hidden answers"). Such a button or link may include text indicating the number of hidden answers. For example, if a question has 26 answers, but answer interface 145 limits the number of displayed answers to 10, the button may include the text "16 more" or "display 16 more". In the embodiment of FIG. 6, clicking on the "21 more" button 640 displays additional answers. Clicking on such a button may display all answers, or may simply display hidden answers. In one embodiment, clicking on such a button displays a dedicated page displaying all answers. In an alternative embodiment, clicking on such a button causes answers to be displayed in a pop-up window.

Answer interface 145 may use a variety of factors to determine which answers to display to a viewing user 125 in the event that only a limited number of answers may be displayed. In one embodiment, answer interface 145 may display answers that have received the most total votes from answering users 110, or that have received the most votes from friends of the viewing user 115. For example, in the embodiment of FIG. 6, answers 620 are ordered according to the number of friends 655 of viewing user that have voted for each answer. Alternatively, answer interface 145 may first display any answers input by questioning user 105 and then may use any suitable factor to display the remainder of answers to be displayed. Answer interface 145 may allow a questioning user 105 or a viewing user 125 to view answer activity since the last time questioning user 105 or viewing user 125 viewed the question and answers. For example, if a viewing user 125 views a question initially, and then views the question a week later, only answers, answer votes, and communications received by answer interface 145 during the past week may be displayed to viewing user 125.

Answer interface 145 may display a picture of answering users 110 next to each answer. In one embodiment, this picture comprises a profile picture of an answering user 110. In an alternative embodiment, this picture comprises a picture determined by the social networking system to best represent an answering user 110. For example, the social networking system may determine that an answering user's face is not present in the answering user's profile picture, and may instead select a picture of the answering user's face using face detection functionality on pictures uploaded by the answering user 110. In one embodiment, an answering user 110, the questioning user 105 or a viewing user 125 selects the picture displayed for an answering user 110.

Answer interface 145 may display a picture for each of multiple answering users 110 next to a displayed answer. In one embodiment, answer interface 145 displays up to a predetermined number of pictures next to a displayed answer. Continuing with the above example, if the predetermined number of pictures to display next to an answer is five, and if seven answering users 110 selected the answer "Moss Beach", the pictures of five of the seven answering users 110 may be displayed next to the answer "Moss Beach". In the embodiment of FIG. 6, up to five pictures of answering users are displayed in a row 655 next to each answer. In one embodiment, the number of pictures displayed by each answer is dependent on the client device a viewing user 125 is using to view the answers or the social networking system context of the displayed answers. For example, if a viewing user 125 is using a large monitor to view answers, answer interface 145 may display more pictures than if a viewing user 125 is using a mobile phone to view answers. In one embodiment, more pictures may be displayed next to each answer if answer interface 145 is displayed within a dedicated social networking system page than if answer interface 145 is display in a more space-limited context of a social networking system 100, such as a pop-up window or a news feed.

In one embodiment, a single row of pictures of answering users 110 is displayed next to each answer. In the event that answer interface 145 limits the number of pictures of answering users 110 that may be displayed next to each answer, answer interface 145 may indicate that more answering users 110 have selected a particular answer than the answering users 110 represented by displayed pictures next to the particular answer. For example, answer interface 145 may display an ellipsis within a button next to answers selected by more answering users 110 than the answer interface limit, or may display the button at the end of a limited single row of pictures next to each answer representing answering users 110 that have selected each answer. Alternatively, answer interface 145 may display a button or link at the end of the picture row containing text indicating that additional answering users 110 have selected a particular answer. Continuing the above example, if ten answering users 110 have selected the answer "Moss Beach", and answer interface 145 limits the number of pictures displayed in a row next to each answer to five, answer interface 145 may include a button or link containing the text "Five more" at the end of the row of pictures. Selecting a button or link indicating that more answering users 110 have selected a particular answer than are shown may result in the display of pictures of the remaining users. For example, clicking the "Five more" button discussed above may cause a pop-up window to appear displaying pictures of the five users not initially shown or displaying the pictures of all answering users. In the embodiment of FIG. 6, button 660 may be clicked to display additional users that have voted for the answer "Rosamunde Sausage Grill."

In one embodiment, answer interface 145 displays pictures next to or in conjunction with answers for all answering users 110. Alternatively, answer interface 145 may display only the pictures of friends of viewing user 115. In yet another embodiment, answer interface 145 may give priority to pictures of friends of viewing user 115, displaying them first in a row next to each answer, and then may display pictures of non-friends of viewing user 120 to fill out the remainder of the row. The order of displayed pictures may be based on affinity between answering users 110 and viewing user 125, may be based on recency of vote, or may be based on any other suitable criteria. Answer interface 145 may include functionality, implemented for instance with a button, which allows a viewing user 125 to toggle between sets of displayed pictures next to each answer.

In one embodiment, answer interface 145 simultaneously displays at least one subset of answer data graphically or textually and at least one subset of answer data pictorially. For example, answer boxes may be shaded according to the percentage of votes each answer receives from answering users 110, while pictures representing friends of viewing user 115 are displayed next to each answer based on the friends of viewing user 115 that voted for each answer. In this example, the answers may be ordered based on the percentage of votes each answer receives from answering users 110 or based on the votes each answer receives from friends of viewing user 115. As the subset of friends of viewing user 115 varies for each distinct viewing user 125, answer interface 145 may display answer data differently for each distinct viewing user 125. In the embodiment of FIG. 6, answer text boxes are shaded according to the overall proportion of votes received by each of answers 620 across all users who voted in question 600, while pictures of users who are friends of the viewing user 115 are displayed next to each answer according to which answer each user selected.

Answer interface 145 may also include communication functionality allowing users to communicate about a question or answers. The communication interface may comprise a field in which a user may enter a text comment. In the embodiment of FIG. 6, viewing users 125 may use field 665 to enter text comments. Continuing with the above example, a user may vote for "Pacifica Beach", but may include the comment, "but only when it isn't foggy out". In one embodiment, comments are displayed below the question and answers in answer interface 145. Alternatively, comments may be displayed when an answered is selected or highlighted, or when a user input is moved over the answer. Answer interface 145 may display an icon or button when users have commented or otherwise communicated within answer interface 145; viewing users may select the icon or button to view the communications. Questioning user 105 may allow all social networking system users to communicate about a question or answers via answer interface 145, or may restrict communication to friends of the questioning user 105, to answering users 110 or to any subset of social networking system users. Answering interface 145 may display a pop-up window requesting a comment from an answering user 110 who merely votes on an answer instead of submitting a new answer or posting a comment within answering interface 145.

Answer interface 145 may display communications for all social networking system users, or may only display a subset of communications, such as the communications of friends of a viewing user 125. Further, answer interface 145 may allow a viewing user to toggle between the sets of communications using, for instance, an "all communications" button and a "friends communications only" button. In the embodiment of FIG. 6, viewing users 125 may use button 670 to toggle between all communications and communications from friends. Answer interface 145 may include functionality allowing users to vote on communications made within answer interface 145. For example, each comment displayed under a question may include a "like" button that a viewing user 125 may select to indicate approval or endorsement of the comment. Answer interface 145 may allow a viewing user 125 to view communications by non-friends of viewing user 120 approved of or endorsed by a friend of the viewing user 115.

Answer interface 145 may order the display of communications in a variety of ways. For example, communications may be sorted chronologically, or may be sorted by the number of votes each communication receives. Further, the method of ordering the display of communications may vary depending on the type of communications displayed. For example, communications made by friends of the viewing user 115 may be sorted chronologically, but communications made by all answering users 110 may be sorted by the number of votes each communication receives.

Newsfeed Question and Answer Data Display

A social networking system 100 may display news stories to a user in a dedicated page called a "newsfeed," which is dynamically customized for each social networking system user. A news story may comprise any interaction between two social networking system objects. In one embodiment, news stories are determined by identifying a first set of nodes connected to a viewing user's node, identifying a second set of nodes connected to the first set of nodes, and identifying an interaction represented by an edge connecting a first node from the first set of nodes and a second node connecting the second set of nodes. For example, the first node may be the social networking system user "Matt", the second node may be the social networking system user "Teri", and the identified interaction may be the beginning of a romantic relationship. In this example, a displayed news story may read "Matt and Teri began dating."

One example of dynamic customization of newsfeed stories is prioritizing news stories by affinity between a viewing user 125 and the viewing user's connections and interests. A news story from a close connection may be displayed higher than another story from a user that has a lower affinity score. News stories involving a question and answer service on a social networking system 100 may mimic this functionality. For example, if a friend of a viewing user interacts with a question in a social networking system question and answer service, the method of display of the interaction may depend on the affinity score between the viewing user and the interacting user. A social networking system 100 may also prioritize the display of news stories based on the type of news story. Likewise, the method of display of news stories involving a question interaction may be prioritized based on the type of question interaction. In this way, the display of news stories involving a question and answer service may be tailored toward the anticipated interests of individual users.

A viewing user 125 may request news stories related to the viewing user 125 in a newsfeed using newsfeed module 170. In one embodiment, requesting news stories comprises requesting access to a newsfeed, for instance loading a newsfeed page. A news story may comprise an interaction between a friend of viewing user 125 and a question (referred to as a "question story"). Examples of interacting with a question include creating a question, answering a question, voting on a question, following a question, tagging a question, recommending a question, commenting on a question or any other suitable form of interaction within the context of the social networking system 100. As discussed above, newsfeed module 170 may determine question stories by identifying users connected to the viewing user 125 using a social graph, and then identifying edges in the social representing questions connected to the identified users.

Newsfeed module 170 may determine a form to display a question story. In one embodiment, newsfeed module 170 selects between two forms to display a question story, a long form and a short form. In one embodiment, the long form comprises the identity of a user, the question interacted with by the user, the type of interaction, and a predetermined number of answers to the question (for instance, three answers). For example, in the embodiment of FIG. 9, question story 900 and question story 910 are displayed in long form. Newsfeed module 170 may use answer module 145 to determine which answers to display in the large form of the question. As discussed above, answer module 145 may use a variety of methods to determine which answers to display to a viewing user 125. In one embodiment, the short form comprises the identity of a user, the question interacted with by the user, and the type of interaction. For example, in the embodiment of FIG. 9, question story 920 is displayed in short form. In other embodiments, newsfeed module 170 may select between more than two forms, and may display a varying number of answers in a question story form.

Newsfeed module 170 may format question story forms to be displayed within the dimensions of an established social networking system newsfeed GUI. Newsfeed module 170 may include a button indicating that a question has more answers than are displayed that when selected displays the additional answers within the newsfeed, in a pop-up window, or in a separate social networking system page. For example, if a question associated with a question story has ten answers, newsfeed module 170 display three answers and may include a button in the question story with the text "7 more." In the embodiment of FIG. 9, question story 900 has five answers, displays three answers and includes a button with the text "2 more". Likewise, question story 910 has three answers, displays all three, and does not include a button to display additional answers.

Figure 9:
FIG. 9 is an example screenshot illustrating the display of questions and answer data in a social networking system interface, in accordance with an embodiment of the invention.

Newsfeed module 170 may also allow a viewing user 125 to interact with question stories in a newsfeed. For example, newsfeed module 170 may allow a viewing user 125 to comment on a question story, to vote in a question story by selecting a displayed answer, to submit an answer to a question in the question story using an answer field, to follow a question story, to expand a question story, to switch question story display forms, or any other suitable form of interaction. In the embodiment of FIG. 9, question story 900 and question story 910 include buttons which allow a viewing user 125 to select an answer.

In one embodiment, newsfeed module 170 determines which question story form to display to a viewing user 125 based on the type of interaction between a user and a question. For example, if a questioning user 105 creates a question, newsfeed module 170 may display a long form question story. Likewise, if an answering user 110 submits an answer to a question, follows a question, tags an object or a user in a question, recommends a question, comments on a question, or is tagged in a question, newsfeed module 170 may display a long form question story. Alternatively, if an answering user 110 votes on an answer in a question without submitting an answer or commenting on the question, or merely views a question, newsfeed module 170 may display a short form question story.

In one embodiment, newsfeed module 170 determines which question story form to display to a viewing user 125 based on a measure of affinity between a user who interacted with a question and a viewing user 125. In one embodiment, affinity between two users depends on the number and strength of connections between the two users, the number and type of objects both users are connected to, and the interactions between the two users. For example, the measure of affinity between two users who are brothers and communicate frequently may be greater than the measure of affinity between two users who have established a connection within the social networking system 100 but who have very few common connected objects and who have not communicated within the social networking system 100. The measure of affinity may be quantified, and newsfeed module 170 may determine a threshold measure of affinity which must be met in order to select a particular question story form. For example, newsfeed module 170 may select a long story form in response to a measure of affinity between a viewing user 125 and another user which exceeds an affinity threshold, and may select a short story form in response to a low measure of affinity which does not exceed the affinity threshold.

In one embodiment, newsfeed module 170 may combine similar question stories for display in a newsfeed to viewing user 125. For example, newsfeed module 170 may identify multiple friends of viewing user 115 who have answered a particular question. In this example, newsfeed module 170 may display a single question story comprising the identities of all four answering users 115, the question answered, the type of interaction, and a pre-determined number of answers. Alternatively, newsfeed module 170 may display the identity of an answering user 110 which the highest affinity with viewing user 125, and may indicate the number of other answering users 110.

System Architecture

Figure 2:
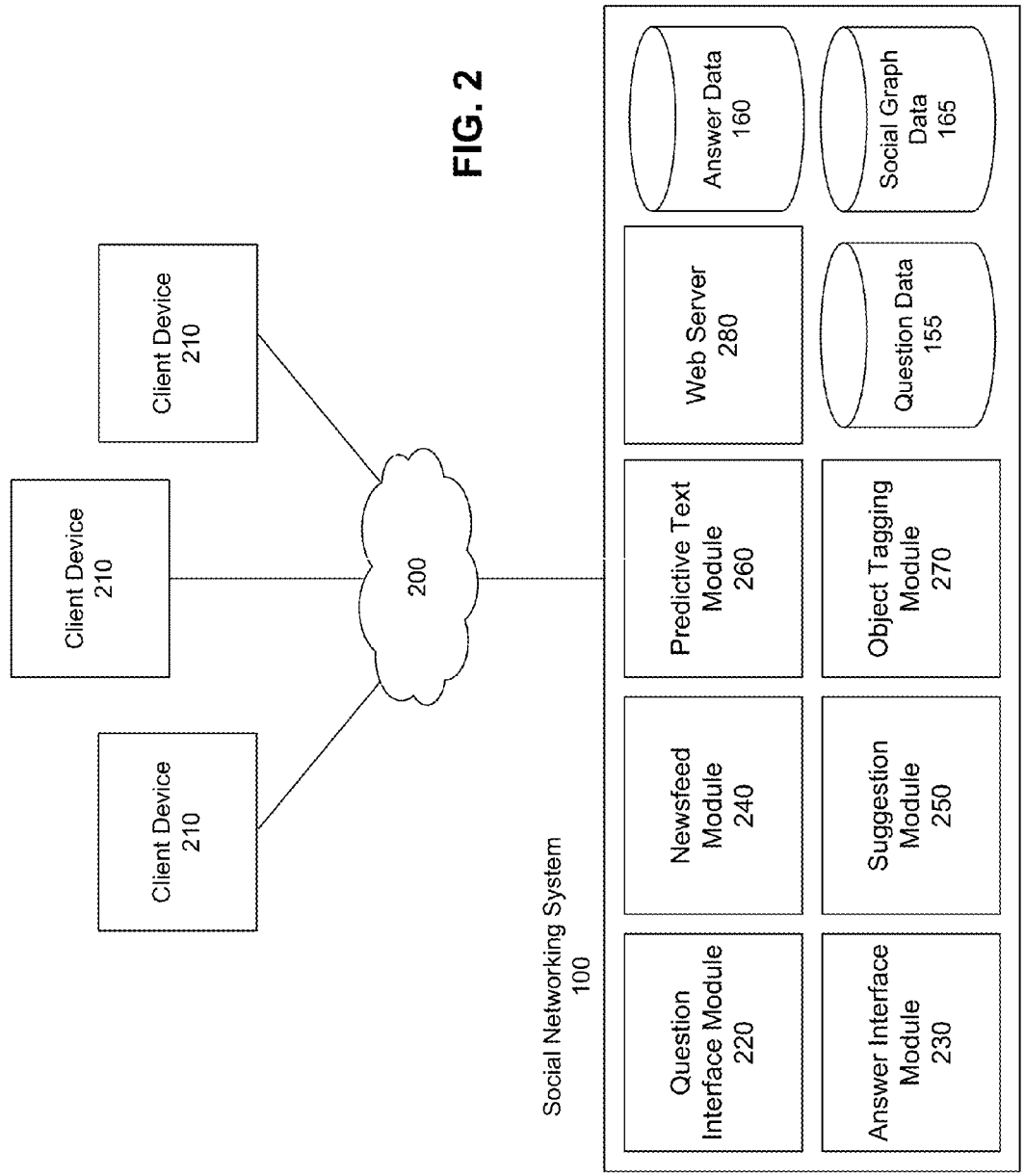
FIG. 2 is a network diagram of a system for displaying question and answer data to users of a social networking system, in accordance with an embodiment of the invention.

FIG. 2 is a network diagram of a system for displaying question and answer data to users of a social networking system, in accordance with an embodiment of the invention. The system environment comprises one or more client devices 210, the social networking system 100, and a network 200. In alternative configurations, different and/or additional modules can be included in the system. For example, although only three client devices 210 are displayed, thousands or more client devices 210 may be coupled to social networking system 100 via network 200.

The client devices 210 comprise one or more computing devices that can receive user input and can transmit and receive data via the network 200. In one embodiment, the client device 210 is a conventional computer system executing, for example, a Microsoft Windows-compatible operating system (OS), Apple OS X, and/or a Linux distribution. In another embodiment, the client device 210 can be a device having computer functionality, such as a personal digital assistant (PDA), mobile telephone, smart-phone, etc. The client device 210 is configured to communicate via network 200. The client device 210 can execute an application, for example, a browser application that allows a user of the client device 210 to interact with the social networking system 100. In another embodiment, the client device 210 interacts with the social networking system 100 through an application programming interface (API) that runs on the native operating system of the client device 210, such as iOS 4 and DROID.

In one embodiment, the network 200 uses standard communications technologies and/or protocols. Thus, the network 200 can include links using technologies such as Ethernet, 802.11, worldwide interoperability for microwave access (WiMAX), 3G, digital subscriber line (DSL), etc. Similarly, the networking protocols used on the network 200 can include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP). The data exchanged over the network 200 can be represented using technologies and/or formats including the hypertext markup language (HTML) and the extensible markup language (XML). In addition, all or some of links can be encrypted using conventional encryption technologies such as secure sockets layer (SSL), transport layer security (TLS), and Internet Protocol security (IPsec).

FIG. 2 contains a block diagram of the social networking system 100. The social networking system 100 includes a question interface module 220, an answer interface module 230, a newsfeed module 240, a suggestion module 250, a predictive text module 260, an object tagging module 270, a web server 280, question data storage module 155, answer data storage module 160, and social graph data storage module 165. In other embodiments, the social networking system 100 may include additional, fewer, or different modules for various applications. Conventional components such as network interfaces, security functions, load balancers, failover servers, management and network operations consoles, and the like are not shown so as to not obscure the details of the system.

The web server 280 links the social networking system 100 via the network 200 to one or more client devices 210; the web server 280 serves web pages, as well as other web-related content, such as Java, Flash, XML, and so forth. The web server 280 may provide the functionality of receiving and routing messages between the social networking system 100 and the client devices 210, for example, instant messages, queued messages (e.g., email), text and SMS (short message service) messages, or messages sent using any other suitable messaging technique. The user can send a request to the web server 280 to upload information, for example, images or videos that are embedded in a question to question data storage module 155. Additionally, the web server 280 may provide API functionality to send data directly to native client device operating systems, such as iOS, DROID, webOS, and RIM.

The web server 280 may also serve web pages including question interfaces and answer interfaces via the network 200 to client devices 210. Alternatively, the web server 280 may also render question interfaces and answer interfaces in native applications on client devices 210. In one embodiment, a web server 280 may render question interfaces on a native platform's operating system, such as iOS or ANDRIOD, to appear as embedded advertisements in native applications.

As discussed above, question data storage module 155 and answer data storage module 160 store data related to question and answers, respectively. This includes but is not limited to the contents of questions and answers, the identities of questioning users 105 and answering users 110, the identity of objects tagged in questions and answers, and any other information related to questions or answers. Social graph data storage module 165 may store any information related in any way to social networking system objects and interactions. Although not shown in FIG. 2, social networking system may additionally comprise storage modules to store additional information, such as user profile information, user settings, global social networking system settings, or any other information produced, received by or stored within social networking system 100.

Question interface module 220 may comprise means within social networking system 100 to implement question interface 140 as discussed above. Likewise, answer interface module 230 may comprise means within social networking system 100 to implement answer interface 145 as discussed above. In addition, newsfeed module 240 may comprise means within social networking system 100 to implement newsfeed module 170 as discussed above.

Suggestion module 250 may suggest users and objects to tag in questions and answers to a questioning user 105, an answering user 110, or a viewing user 125 via question interface module 220 or answer interface module 230. In one embodiment, suggestion module 240 retrieves data from question data storage module 155 or answer data storage module 160, parses the retrieved data, and identifies users or objects within social graph data storage module 165 to suggest to a tagging user based on the parsed retrieved data.

Predictive text module 260 may suggest text associated with partial or full typed questions and answers. In one embodiment, predictive text module 260 identifies text being entered via question interface module 220 or answer interface module 230, identifies objects stored in social graph data storage module 165 related to the identified text, and displays the identified objects to a user interface with question interface module 220 or answer interface module 230. For example, if a user begins typing a name, predictive text module 260 may identity all friends of the user using data stored in social graph data storage module 165, may identify a subset of friends of the user with names containing the typed text, and may display the subset of friends to the user via question interface module 220 or answer interface module 230.

Object tagging module 270 allows a questioning user 105, an answering user 110, or a viewing user 125 to tag users or objects in a question or an answer. In one embodiment, a user tags objects in a question through question interface module 220 and tags objects in an answer through answer interface module 230. In one embodiment, object tagging module 270 tags an object in a question or an answer by identifying an object in social graph data storage module 165, and associating the identified object with a question stored in question data storage module 155 or with an answer stored in answer data storage module 160.

Presenting Question and Answer Data in a Social Networking System

Figure 3:
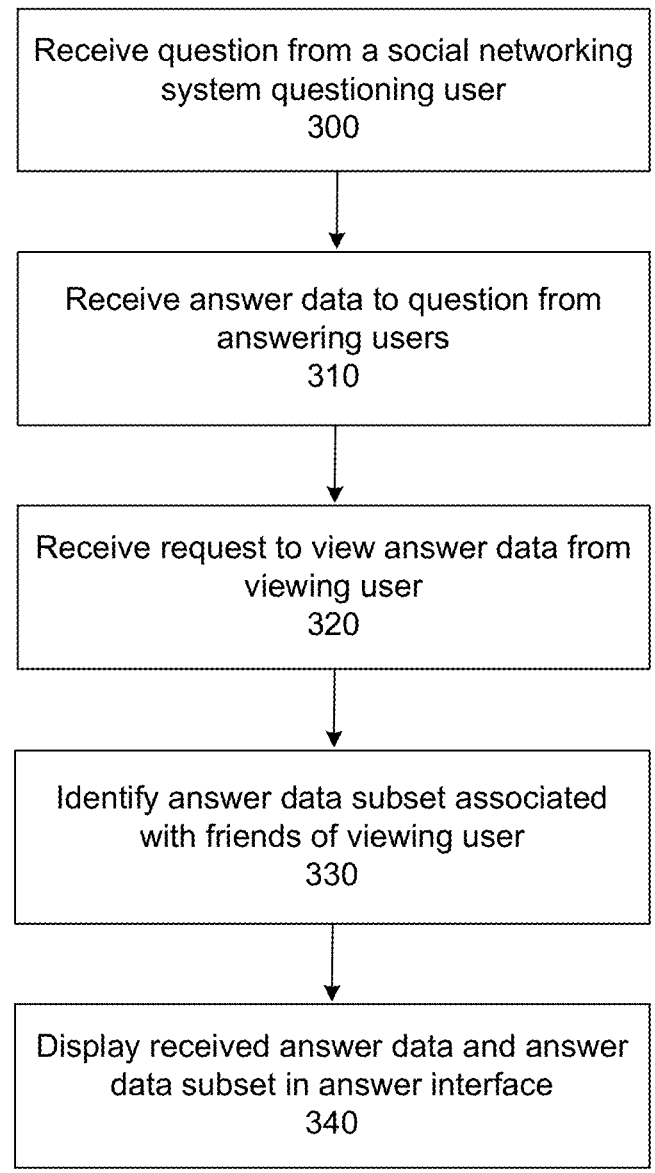
FIG. 3 is a flowchart of a process for displaying a plurality of subsets of question and answer data within the same question interface, in accordance with an embodiment of the invention.

FIG. 3 is a flowchart of a process for displaying a plurality of subsets of question and answer data within the same question interface, in accordance with an embodiment of the invention. A question is received 300 from a social networking system questioning user. Answer data for the question is received 310 from answering users. A request is received 320 to view answer data from a viewing user. An answer data subset associated with friends of a viewing user is identified 330. The received answer data and the identified answer data subset are displayed 340 in an answer interface.

Figure 4:
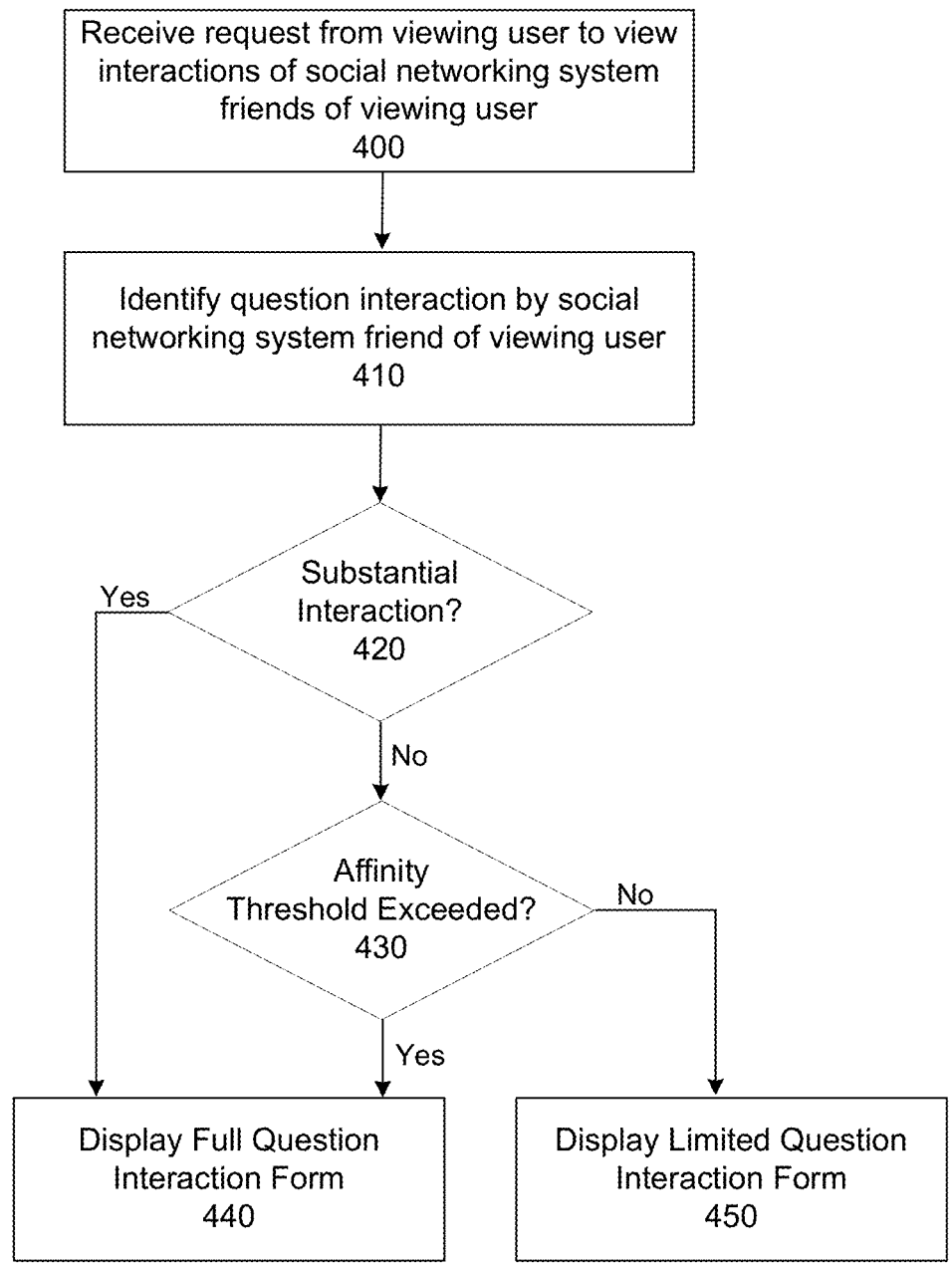
FIG. 4 is a flowchart of a process for determining the format of question and answer data to display to a requesting user, in accordance with an embodiment of the invention.

FIG. 4 is a flowchart of a process for determining the format of question and answer data to display to a requesting user, in accordance with an embodiment of the invention. A request is received 400 from a viewing user to view the interactions of social networking system friends of the viewing user. An interaction is identified 410 between a social networking system friend of the viewing user and a question. If the interaction is substantial, a full question interaction form is displayed 440 to viewing user. If the interaction is not substantial, but an affinity threshold is exceeded, a full question interaction form is displayed 440 to a viewing user. If an affinity threshold is not exceeded, a limited question interaction form is displayed 450 to a viewing user.

Figure 5:
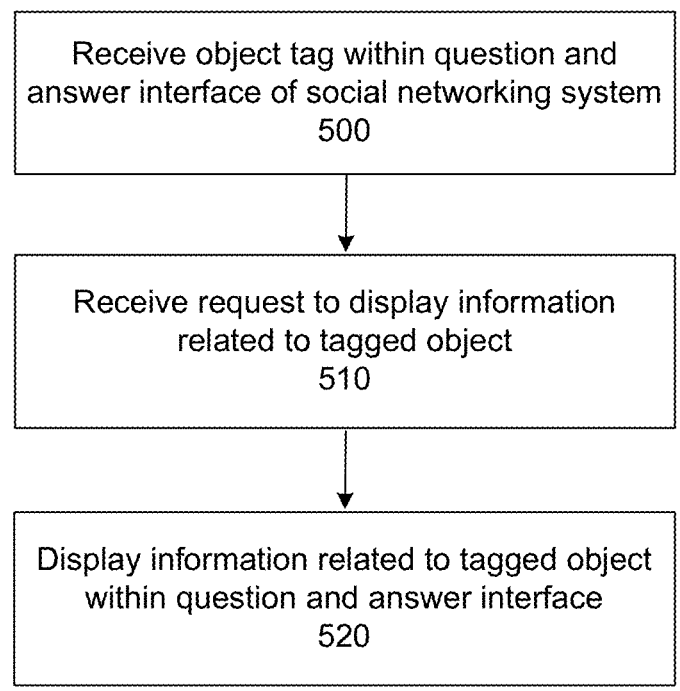
FIG. 5 is a flowchart of a process for displaying object information within the context of a question and answer interface of a social networking system, in accordance with an embodiment of the invention.

FIG. 5 is a flowchart of a process for displaying object information within the context of a question and answer interface of a social networking system, in accordance with an embodiment of the invention. An object tag is received 500 within a question and answer interface of a social networking system. A request to display information related to the tagged object is received 510. Information related to the tagged object is displayed 520 within the question and answer interface of the social networking system.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method for displaying answer data to questions asked in a social networking system, the method comprising:
   presenting a question to a plurality of users of a social networking system;
   receiving an answer to the question from one or more of the users of a social networking system;
   receiving a request from a viewing user to view the answers, wherein the viewing user has established a connection in the social networking system with one or more of the users who answered the question;
   generating an answer display that illustrates (1) a first set of answers provided by all users who answered the question, and (2) a second set of answers provided by the users who have established a connection in the social networking system with the viewing user; and
   sending the answer display for display to the viewing user.

2. The computer-implemented method of claim 1, wherein the question is received from a questioning user via a social networking system question interface.

3. The computer-implemented method of claim 2, wherein one or more answers to the question are received from the questioning user.

4. The computer-implemented method of claim 1, wherein receiving an answer from one or more users comprises:
   receiving answer text from a user; and
   displaying the answer text to other users of the social networking system such that the other users may vote on the displayed answer text.

5. The computer-implemented method of claim 1, wherein receiving an answer from one or more users comprises:
   receiving a vote from the one or more users, the vote comprising a selection of one of the answers.

6. The computer-implemented method of claim 1, wherein receiving a request to view the answers from a viewing user comprises receiving a request from a viewing user to view a social networking system page displaying the presented question and the received answers.

7. The computer-implemented method of claim 1, wherein receiving a request to view the answers from a viewing user comprises receiving a request from a viewing user to view a social networking system page displaying news stories of social networking system users associated with the viewing user, and wherein one or more new stories comprises an interaction between a social networking system user associated with the viewing user and the presented question.

8. The computer-implemented method of claim 1, wherein the second set of answers comprises answers provided by all users who have established a connection in the social networking system with the viewing user.

9. The computer-implemented method of claim 1, wherein the second set of answers comprises answers provided by a subset of all users who have established a connection in the social networking system with the viewing user.

10. The computer-implemented method of claim 1, wherein generating an answer display comprises:
    generating a display that illustrates at least one received answer;
    generating a display that illustrates a portion of the first set of answers associated with each illustrated answer in conjunction with the illustrated answer; and
    generating a display that illustrates a portion of the second set of answers associated with each illustrated answer in conjunction with the illustrated answer.

11. The computer-implemented method of claim 10, wherein illustrating a set of answers in the answer display comprises illustrating answer text for an answer in the set of answers in a text box.

12. The computer-implemented method of claim 11, wherein illustrating the first set of answers in the answer display comprises shading a portion of each text box illustrating answer text.

13. The computer-implemented method of claim 10, wherein illustrating the second set of answers in the answer display comprises:
    displaying a picture representing a user who provided an illustrated answer in the second set of answers in conjunction with the illustrated answer.

14. The computer-implemented method of claim 10, wherein illustrating a first set of answers and illustrating a second set of answers comprises illustrating a number or proportion of votes in conjunction with the illustrated answers.

15. The computer-implemented method of claim 10, wherein a predetermined number of answers are illustrated, and wherein the answer display comprises an option that when selected by a viewing user illustrates additional answers.

16. The computer-implemented method of claim 10, wherein the order of illustrated answers is based on the first set of answers.

17. The computer-implemented method of claim 10, wherein the order of illustrated answers is based on the second set of answers.

18. A computer-implemented method for displaying answer data to questions asked in a social networking system, the method comprising:
    presenting a question to a plurality of users of a social networking system;
    receiving an answer to the question from one or more of the users of a social networking system;
    receiving one or more answer votes from one or more of the users of the social networking system, wherein an answer vote comprises the selection of a received answer by the one or more users of the social networking system;
    receiving a request from a viewing user to view the answers, wherein the viewing user has established a connection in the social networking system with one or more of the users who answered the question or who voted on an answer;
    generating a first answer display that illustrates received answers in text boxes, the text boxes shaded based on the received one or more answer votes;
    generating a second answer display that illustrates images of the one or more users with whom the viewing user has established a connection in conjunction with the answer received or voted on by the one or more users; and
    sending the first answer display and the second answer display for display to the viewing user.

19. The computer-implemented method of claim 18, wherein receiving a request to view the answers from a viewing user comprises receiving a request from a viewing user to view a social networking system page displaying the presented question and the received answers.

20. The computer-implemented method of claim 18, wherein receiving a request to view the answers from a viewing user comprises receiving a request from a viewing user to view a social networking system page displaying news stories of social networking system users associated with the viewing user, and wherein one or more new stories comprises an interaction between a social networking system user associated with the viewing user and the presented question.

* * * * *